Feb. 14, 1928.
J. S. BLOOM
1,659,424
CORN CUTTER AND METHOD OF MAKING THE SAME
Filed June 7, 1926     2 Sheets-Sheet 1
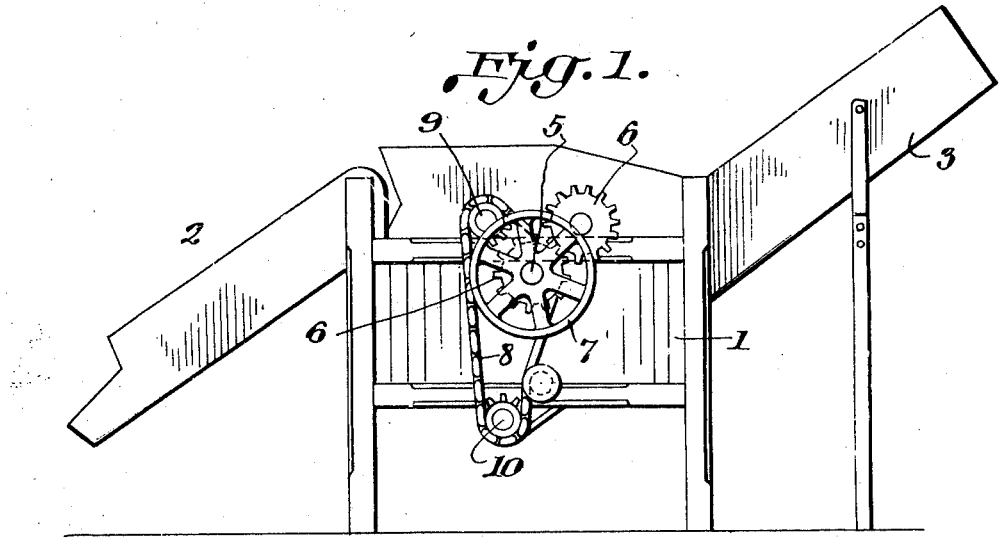
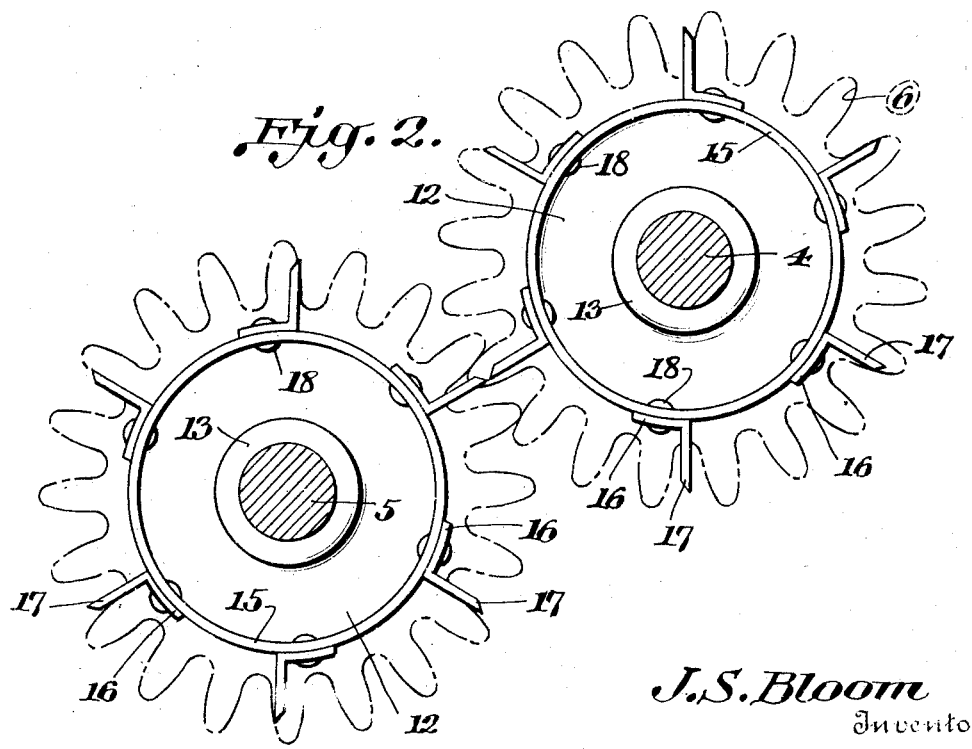
J. S. Bloom
Inventor Feb. 14, 1928.

J. S. BLOOM 1,659,424

CORN CUTTER AND METHOD OF MAKING THE SAME

Filed June 7, 1926          2 Sheets-Sheet 2

J. S. Bloom
Inventor

By C. A. Snow & Co.
Attorneys

Patented Feb. 14, 1928.

1,659,424

UNITED STATES PATENT OFFICE.

JOHN S. BLOOM, OF INDEPENDENCE, IOWA.

CORN CUTTER AND METHOD OF MAKING THE SAME.

Application filed June 7, 1926. Serial No. 114,237.

This invention relates to a machine designed primarily for cutting ears of corn into pieces of desired sizes, one of the objects of the invention being to provide cutters including rolls of novel construction on which the blades are so mounted as to be readily attached and removed.

A further object is to provide rotatable cutting elements having a driving connection therebetween which allows the blades to be adjusted toward or from each other both annularly and radially with respect to the axes of rotation thereof.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of a machine having the present improvements combined therewith.

Figure 2 is an end elevation of the cutting elements and their cylinders, the shafts on which they are mounted being shown in section and said cylinders being positioned to cause the blades thereon to move into register during the cutting operation.

Figure 3:
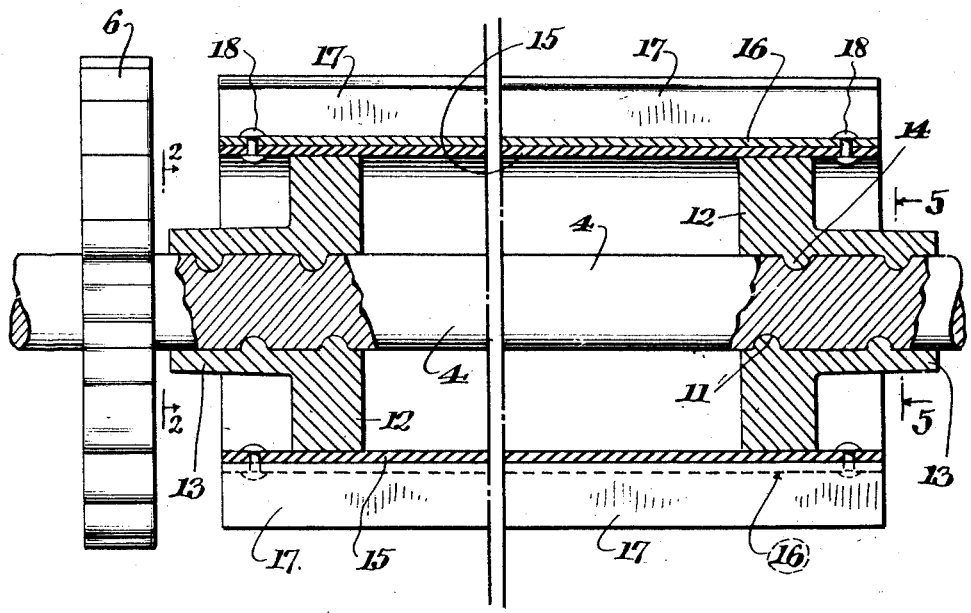
Figure 3 is a longitudinal section through one of the cylinders, its shaft being shown partly in elevation.

Referring to the figures by characters of reference 1 designates the housing of the machine provided with an elevating feeder 2 of the usual or any preferred construction and with a delivering elevator 3.

Located within the housing 1 is cutting mechanism designed to receive the ears of corn as they are delivered from the elevator 2. This cutting mechanism includes spaced transverse shafts 4 and 5 each of which has a gear 6 provided with elongated teeth, it thus being possible to adjust the shafts 4 and 5 toward and from each other to a considerable extent without moving the teeth out of mesh. Shaft 5 is not adjustable but carries a drive pulley 7. Chain and sprocket mechanism indicated generally at 8 can be used for transmitting motion from the shaft 5 to a shaft 9 of the feeding elevator and to a shaft 10 of the delivering elevator.

Both of the shafts 4 and 5 as well as the cutting mechanisms thereon are of the same construction and therefore a description of one is thought to be all that is necessary. Shaft 4, for example, has depressions 11 therein and metal heads 12 provided with projecting hubs 13 are cast about these portions of the shaft so as to be made substantially integral therewith. After the heads have thus been cast, with integral lugs 14 extending into the depressions 11, the heads are turned down to the desired diameter and thereafter a metal cylinder 15 of proper dimensions is expanded by heat and placed upon the heads with the ends of the cylinder projecting beyond the outer faces of the heads. These cylinders, when cooled, will shrink on the heads so that it becomes impossible to readily detach them.

Arranged longitudinally upon the outer surface of each cylinder are attaching strips 16 each having an outstanding blade 17 extending throughout the length thereof and of the cylinder. The end portions of the strip 16 which bear upon the projecting end portions of the cylinder are held to said cylinder by rivets 18 the inner heads of which are exposed within the projecting ends of the cylinder while the outer heads are of course exposed upon the outer surface of the strips 16. It will be apparent, therefore, that these strips 16 with their outwardly extended blades 17 can be readily attached to or removed from the cylinder after the parts of the cylinder have been assembled. The outer edge of each blade 17 is sharpened.

Figures 4, 5:
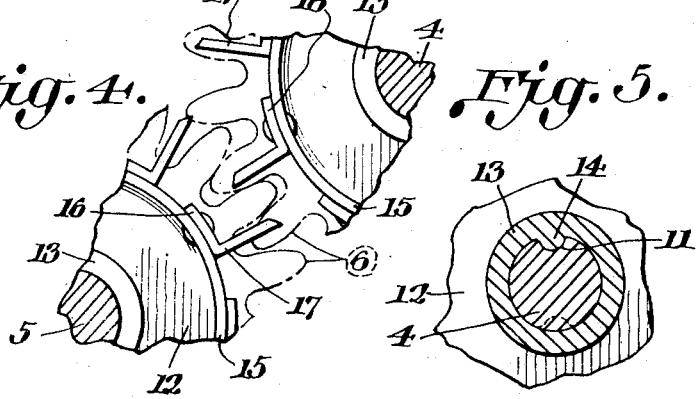
Figure 4 is an end elevation of portions of the two cylinders and showing the relative positions of the cutting elements after the cylinders have been adjusted annularly to cause the blades thereon to act alternately upon the ears supplied to the machine.
Figure 5 is a section on line 5—5, Figure 3.

As before stated two of these cylinders with cutting blades thereon are used and the gears which are carried by the shafts 4 and 5 are so proportioned that, by adjusting shaft 4 away from shaft 5 the blades 17, rotatable with shaft 4, can match with and extend close to the cutting edges of the blades 17 rotatable with shaft 5. Obviously, therefore, ears of corn directed into the pass between the cylinders will be acted on by the matching blades which will cut into the ears from opposed sides. Should it be desired to cut the ears into smaller pieces, the gear rotatable with shaft 4 is adjusted out of mesh with the other gear and is then given a partial rotation so as to position the blades of shaft 4 where they will project between the blades 17 carried by shaft 5. The two gears are then moved back into mesh as shown in Figure 4. Consequently when ears are supplied to the pass between the cylinders, they will be cut successively by the blades on the two cylinders and as these blades are positioned one back of the other it will be obvious that the material will be cut up into much smaller pieces than would be possible should the blades be arranged as in Figure 2. The teeth of the two gears 6 are sufficiently long to permit transmission of motion from one gear to the other when said gears are in either of the positions shown in Figures 2 and 4.

What is claimed is:

1. In a machine of the class described a cutting element including a shaft, heads having integral anchoring means embedded in the shaft, a cylindrical drum frictionally held upon the heads and projecting laterally therebeyond, strips extending longitudinally of the drum, fastening means extending through said strips and the projecting end portions of the drum, and outwardly extending radial blades integral with the strips.

2. The herein described method of producing a cutting element which consists in casting heads about a shaft, there being recesses in the shaft for receiving some of the metal of the heads, thereby to key the heads of the shaft, subsequently shrinking a length of tubular metal upon the heads with the ends of said lengths projecting laterally therebeyond, applying a blade to the outer surface of the tubular member, and fastening the ends of the blade to the projecting end portions of the tubular member.

In testimony that I claim the foregoing as my own, I have hereto affixed my signature.

JOHN S. BLOOM.